Jan. 12, 1932.　　　　E. P. ANTHONY　　　　1,840,928
FASTENING DEVICE
Filed Aug. 13, 1930
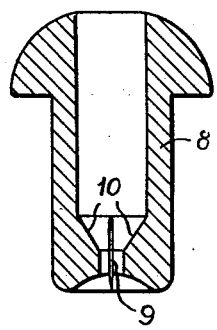
Fig.1.
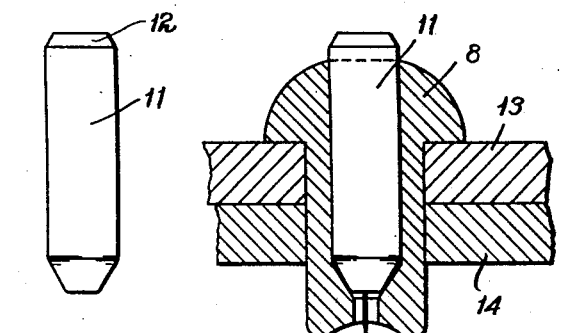
Fig.3.
Fig.4.
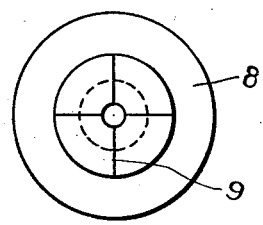
Fig.2.
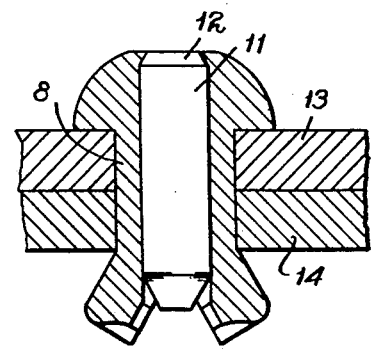
Fig.5.
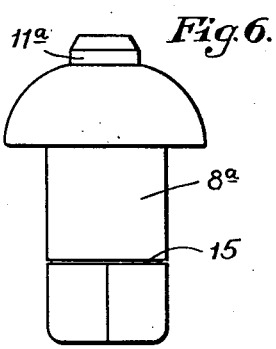
Fig.6.
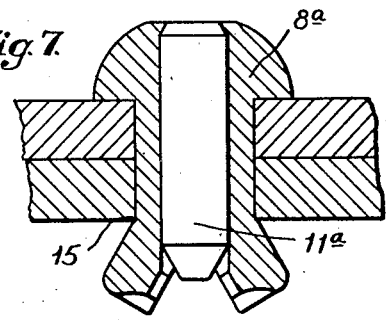
Fig.7.
INVENTOR
Emery P. Anthony
BY
Archworth Martin
ATTORNEY Patented Jan. 12, 1932

1,840,928

UNITED STATES PATENT OFFICE

EMERY P. ANTHONY, OF BRACKENRIDGE, PENNSYLVANIA, ASSIGNOR OF ONE-HALF TO DAVID C. EATON, OF TARENTUM, PENNSYLVANIA

FASTENING DEVICE

Application filed August 13, 1930. Serial No. 475,077.

My invention relates to fastening devices, and more particularly to those of the type referred to as self-heading rivets, which are commonly employed for holding two overlapping plates or the like in assembled relation.

One object of my invention is to provide a device of the character referred to wherein the drive pin for expanding the inner end of the rivet is automatically locked in place during driving of the same into set position, and wherein the space between the pin and the tubular rivet is sealed against entry of moisture.

Another object of my invention is to provide a structure wherein the outer end of the pin and the rivet head are caused to present a substantially smooth and unbroken appearance when the expanding pin is in set position.

Another object of my invention is to provide a rivet that is more firmly held in place than are various types which have heretofore been employed.

Some of the forms which my invention may take are shown in the accompanying drawings wherein Figure 1 is a longitudinal sectional view of a tubular rivet; Fig. 2 is a bottom plan view of the rivet of Fig. 1; Fig. 3 shows the drive pin employed; Fig. 4 shows the rivet and pin assembled in position for expansion of the inner end of the rivet to secure a pair of plates together; Fig. 5 shows the pin driven home, with the inner end of the rivet expanded; Fig. 6 shows a modified form of rivet, and Fig. 7 shows the rivet of Fig. 6 in its expanded condition.

Referring to Figs. 1 to 4, the hollow or tubular rivet is designated by the numeral 8, the inner end of the rivet having a plurality of longitudinally-extending slots 9 and internally thickened portions or bosses 10 whose upper sides are bevelled or inclined for engagement by the lower or inner bevelled end of a drive pin 11. The outer end of the pin is bevelled as indicated at 12.

In Fig. 4, the rivet and pin are shown as positioned in holes contained in plates 13 and 14 which are to be fastened together. Upon driving of the pin 11, the inner end of the rivet will be expanded, as shown in Fig. 5, to clamp the plates 13 and 14 together. Hammer blows imparted to the outer end of the pin after it has reached substantially its inner extremity of movement will be received also by the outer end of the rivet which is commonly of malleable metal, causing the metal of the rivet adjacent to the bevelled end 12 of the rivet to be peened over into snug contact with the bevelled portion 12 of the pin. In actual practice, it has been found that the line of division between such bevelled portion and the peened over portion of the rivet head is not discernible to the eye except on very close inspection. The rivet head and the end of the pin thus present a substantially smooth and unbroken appearance, and furthermore, a seal is thereby provided against the entry of moisture between the pin and the rivet, at their outer ends.

Notwithstanding the peening over of a small amount of metal at the outer end of the pin, the pin can be driven from the rivet by a tool applied to the inner end thereof, to permit contraction of the inner end of the rivet and the withdrawal thereof from the plates. The pin may have either a loose or a snug fit with the rivet when placed therein previously to being driven for the purpose of expanding the rivet. In the case of a loose fit between the pin and the rivet, I may coat the interior of the rivet or the pin with resin or the like, to hold them in assembled relation during shipping and to assist in excluding moisture.

Referring now to Figs. 6 and 7, I show a pin 11$^a$ and a rivet 8$^a$. The rivet 8$^a$ is of somewhat the form of the rivet 8 but has a small groove or score mark 15 extending circumferentially thereof and at such distance from the head of the rivet that it will be in alinement with the underside of the lowermost plate when the rivet is in position. The groove 15 serves to produce a shoulder-like effect when the inner end of the rivet is expanded, such shoulder being disposed beneath the bottom plate and serving to more effectively retain the rivet against accidental withdrawal or from becoming loose.

I claim as my invention:—

1. A fastening device for securing plate-like members together, comprising a tubular rivet of malleable material having an enlarged head at one end and slitted in a lengthwise direction at its other end, the distance between the slits and the said head being substantially equal to the combined thickness of the members, and the rivet being provided with a circumferential score mark at the inner ends of said slits to define a definite line of bend and to provide a seating shoulder when the slit end of the rivet is expanded, and a pin adapted to be driven into the said rivet to expand the slit end thereof.

2. A fastening device for securing plate-like members together, comprising a tubular rivet of malleable material having an enlarged head at one end and slitted in a lengthwise direction at its other end, the distance between the slits and the said head being substantially equal to the combined thickness of the members, and the rivet being provided with a circumferential score mark at the inner ends of said slits to define a definite line of bend and to provide a seating shoulder when the slit end of the rivet is expanded, and a pin adapted to be driven into the said rivet to expand the slit end thereof, the outer end of the pin being substantially flush with the outer side of the rivet head, but having a circumferential bevel to permit peening of the rivet head into engagement with the bevelled surface.

In testimony whereof I, the said EMERY P. ANTHONY, have hereunto set my hand.

E. P. ANTHONY.